United States Patent
Khan et al.

(10) Patent No.: US 7,477,636 B2
(45) Date of Patent: Jan. 13, 2009

(54) PROCESSOR WITH SCHEDULER ARCHITECTURE SUPPORTING MULTIPLE DISTINCT SCHEDULING ALGORITHMS

(75) Inventors: Asif Q. Khan, Austin, TX (US); David B. Kramer, Austin, TX (US); David P. Sonnier, Austin, TX (US)

(73) Assignee: Agere Systems Inc., Allentown, PA (US)

( * ) Notice: Subject to any disclaimer, the term of this patent is extended or adjusted under 35 U.S.C. 154(b) by 938 days.

(21) Appl. No.: 10/722,933

(22) Filed: Nov. 26, 2003

(65) Prior Publication Data

US 2005/0111461 A1 May 26, 2005

(51) Int. Cl.
*H04B 7/212* (2006.01)

(52) U.S. Cl. .................... 370/347; 370/395.4; 370/411; 370/412

(58) Field of Classification Search .............. 370/395.4, 370/412, 341, 347, 352, 389, 395.43, 411, 370/422

See application file for complete search history.

(56) References Cited

U.S. PATENT DOCUMENTS

| | | | |
|---|---|---|---|
| 6,389,019 B1 * | 5/2002 | Fan et al. ................ | 370/395.42 |
| 6,414,963 B1 * | 7/2002 | Gemar .................... | 370/412 |
| 6,477,168 B1 * | 11/2002 | Delp et al. .............. | 370/395.4 |
| 6,661,774 B1 * | 12/2003 | Lauffenburger et al. .. | 370/230.1 |
| 6,721,325 B1 * | 4/2004 | Duckering et al. ....... | 370/395.4 |
| 7,085,279 B1 * | 8/2006 | Kumar et al. ............ | 370/401 |
| 7,120,153 B1 * | 10/2006 | Anconetani et al. ...... | 370/395.4 |
| 7,215,675 B2 * | 5/2007 | Kramer et al. ........... | 370/395.4 |
| 7,224,681 B2 * | 5/2007 | Kramer et al. ........... | 370/347 |
| 7,245,624 B2 * | 7/2007 | Kramer et al. ........... | 370/395.4 |
| 7,245,627 B2 * | 7/2007 | Goldenberg et al. ...... | 370/419 |
| 2003/0161316 A1 * | 8/2003 | Kramer et al. ........... | 370/395.4 |

OTHER PUBLICATIONS

U.S. Appl. No. 10/085,219, filed Feb. 28, 2002, D.B. Kramer et al., "Processor with Dynamic Table-Based Scheduling Using Linked Transmission Elements for Handling Transmission Request Collisions."

U.S. Appl. No. 10/085,223, filed Feb. 28, 2002, D.B. Kramer et al., "Processor with Dynamic Table-Based Scheduling Using Multi-Entry Table Locations for Handling Transmission Request Collisions."

(Continued)

*Primary Examiner*—Hassan Kizou
*Assistant Examiner*—Brian T O'Connor

(57) ABSTRACT

A processor includes a scheduler operative to schedule data blocks for transmission from a plurality of queues or other transmission elements, utilizing at least a first table and a second table. The first table may comprise at least first and second first-in first-out (FIFO) lists of entries corresponding to transmission elements for which data blocks are to be scheduled in accordance with a first scheduling algorithm, such as a weighted fair queuing scheduling algorithm. The scheduler maintains a first table pointer identifying at least one of the first and second lists of the first table as having priority over the other of the first and second lists of the first table. The second table includes a plurality of entries corresponding to transmission elements for which data blocks are to be scheduled in accordance with a second scheduling algorithm, such as a constant bit rate or variable bit rate scheduling algorithm.

20 Claims, 2 Drawing Sheets

OTHER PUBLICATIONS

U.S. Appl. No. 10/085,222, filed Feb. 28, 2002, D.B. Kramer et al., "Processor with Table-Based Scheduling Using Software-Controlled Interval Computation."

U.S. Appl. No. 10/085,771, filed Feb. 28, 2002, D.B. Kramer et al., "Processor with Software-Controlled Programmable Service Levels."

* cited by examiner

PROCESSOR WITH SCHEDULER ARCHITECTURE SUPPORTING MULTIPLE DISTINCT SCHEDULING ALGORITHMS

RELATED APPLICATIONS

The present invention is related to the inventions described in U.S. patent applications Ser. No. 10/085,219 entitled "Processor With Dynamic Table-Based Scheduling Using Linked Transmission Elements For Handling Transmission Request Collisions," Ser. No. 10/085,223 entitled "Processor With Dynamic Table-Based Scheduling Using Multi-Entry Table Locations For Handling Transmission Request Collisions," Ser. No. 10/085,222 entitled "Processor With Table-Based Scheduling Using Software-Controlled Interval Computation," and Ser. No. 10/085,771 entitled "Processor With Software-Controlled Programmable Service Levels," all filed Feb. 28, 2002, commonly assigned herewith and incorporated by reference herein.

FIELD OF THE INVENTION

The present invention relates generally to techniques for transmitting packets or other blocks of data over a network, and more particularly to a network processor or other type of processor configured for use in performing operations such as routing or switching of packets or other data blocks.

BACKGROUND OF THE INVENTION

A network processor generally controls the flow of data between a physical transmission medium, such as a physical layer portion of a network, and a switch fabric in a router or other type of switch.

An important function of a network processor involves the scheduling of cells, packets or other data blocks for transmission to the switch fabric from the physical transmission medium of the network and vice versa. A network processor typically includes a scheduler for implementing this function. It is often desirable for a given network processor to support a number of different processing configurations, each of which may require a distinct scheduling algorithm. For example, a network processor may need to support constant bit rate, variable bit rate and weighted fair queuing scheduling algorithms. In typical conventional practice, the network processor may be configured to include separate hardware architectures to support each of the desired scheduling algorithms. However, each of the separate architectures generally requires a particular set of dedicated hardware resources, which can result in wasted resources if some of the supported scheduling algorithms are not used in a given network processor application. Also, such dedicated hardware architectures fail to provide adequate flexibility to implement different scheduling algorithms that were not specified at the time the hardware was defined.

The techniques disclosed in the above-cited U.S. patent applications address the problems associated with use of separate hardware architectures for each of a number of scheduling algorithms in a network processor. Notwithstanding the considerable advances provided by these techniques, a need remains for further improvements in scheduling algorithm implementation in a network processor.

SUMMARY OF THE INVENTION

The invention provides improved techniques for scheduling data blocks, illustratively comprising packets or other protocol data units (PDUs), for transmission in a network processor or other type of processor.

In accordance with one aspect of the invention, a processor includes a scheduler or other type of scheduling circuitry operative to schedule data blocks for transmission from a plurality of queues or other transmission elements, utilizing at least a first table and a second table.

The first table may comprise at least first and second first-in first-out (FIFO) lists of entries corresponding to transmission elements for which data blocks are to be scheduled in accordance with a first scheduling algorithm, such as a weighted fair queuing scheduling algorithm. More than two such lists may be used in a given embodiment. The scheduler maintains a first table pointer identifying at least one of the first and second lists of the first table as having priority over the other of the first and second lists of the first table. In scheduling data blocks for transmission utilizing the first table, the scheduler identifies a first entry in a first non-empty one of the lists starting from a list identified by the first table pointer, and schedules for transmission a data block from the corresponding transmission element. Such an arrangement advantageously allows the scheduler to implement a fully work-conserving priority-based scheduling algorithm.

As a more particular example of the scheduling of data blocks utilizing the first table, the first and second lists of the first table may comprise respective active and pending lists, with the active list being a list of one or more of the transmission elements which have not exceeded corresponding bandwidth allocations, and the pending list being a list of one or more of the transmission elements which have exceeded corresponding bandwidth allocations. The first table pointer initially points to the active list, and when the active list becomes empty, the pointer is updated to point to the pending list, the pending list is designated as a new active list, and the previous active list is designated as a new pending list. Also, a given transmission element which has exceeded its corresponding bandwidth allocation may be moved from the first table to the second table in order to provide an adjustment in its scheduling rate. Such adjustments may be made utilizing hardware or software based algorithms, or other suitable mechanisms.

The second table, which may illustratively comprise a dynamic calendar table, includes a plurality of entries corresponding to transmission elements for which data blocks are to be scheduled in accordance with a second scheduling algorithm, such as a constant bit rate or variable bit rate scheduling algorithm. Association of a given one of the transmission elements with a particular one of the second table entries establishes a scheduling rate for that transmission element. The scheduler maintains a second table pointer identifying a current one of the second table entries that is eligible for transmission. The second table pointer may be implemented as a current pointer which is incremented in accordance with a time base of the scheduler.

The second table is preferably configured such that each of the plurality of transmission elements can be dynamically assigned a transmission rate. For example, a desired scheduling rate for a given one of the transmission elements may be established by entering an identifier of that element into a particular one of the entries of the second table, the particular entry being determined as a function of the second table pointer and a designated scheduling interval. The designated scheduling interval may be dynamically alterable under software control.

The present invention in the illustrative embodiment provides an efficient and flexible scheduler architecture capable of supporting multiple scheduling algorithms. The architecture is particularly advantageous in the network processor context in that it provides sufficient flexibility to allow the implementation of new algorithms as they are defined without requiring redesign of the hardware or other elements of the network processor. A single network processor design can thus be used in a wide variety of processing applications. In the illustrative embodiment, this may be accomplished utilizing a combination of a work-conserving bandwidth sharing mechanism and a non-work-conserving explicit rate establishment mechanism.

DETAILED DESCRIPTION OF THE INVENTION

The invention will be illustrated herein in conjunction with an exemplary system for processing data for transmission through a network. The exemplary system includes a network processor configured in a particular manner in order to illustrate the techniques of the invention. It should be understood, however, that the invention is more generally applicable to any processor in which it is desirable to provide improved flexibility in the implementation of a scheduling algorithm for use in the processor.

A "processor" as the term is used herein may be implemented, by way of example and without limitation, utilizing elements such as those commonly associated with a microprocessor, central processing unit (CPU), digital signal processor (DSP), application-specific integrated circuit (ASIC), or other type of data processing device, as well as portions and combinations of such elements.

The present invention in an illustrative embodiment improves scheduling operations in a network processor or other type of processor through the use of unified scheduler architecture based on a set of FIFO lists and a dynamic calendar table. Advantageously, this arrangement facilitates the implementation of a wide variety of scheduling algorithms within a single network processor, under software control, thereby avoiding the need for separate hardware architectures to support each of the desired scheduling algorithms. For example, in the illustrative embodiment, the unified scheduler architecture supports constant bit rate, variable bit rate and weighted fair queuing algorithms, minimum and maximum rate guarantee algorithms, dynamic oversubscription algorithms, as well as additional algorithms.

It should be noted that the scheduling techniques of the present invention may be used in conjunction with the collision handling and programmable service level techniques described in the above-cited U.S. patent applications.

Figure 1:
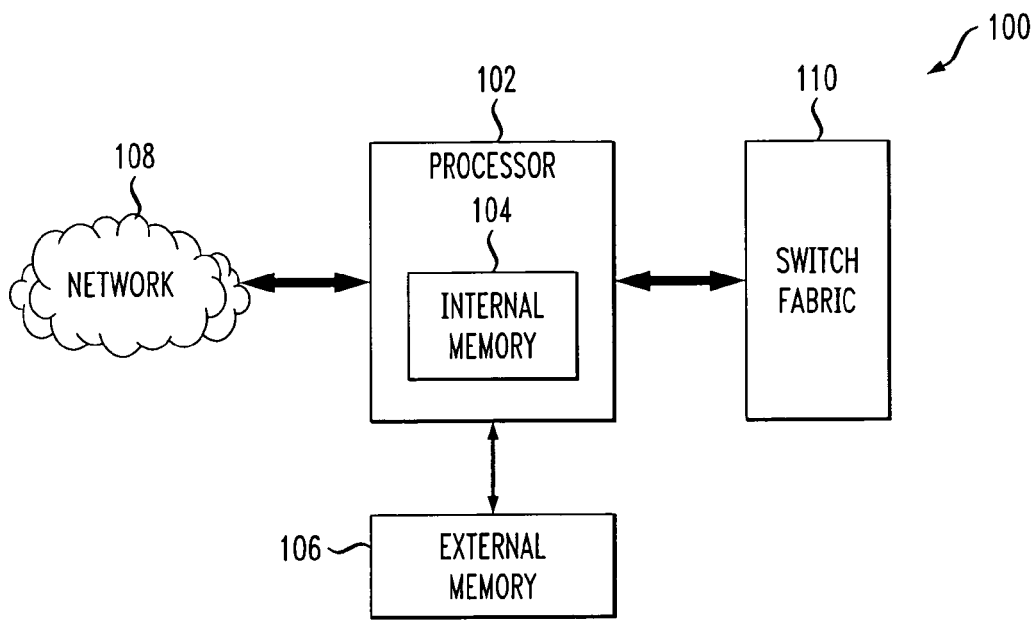
FIG. 1 is a simplified block diagram of an illustrative embodiment of a processing system in which the present invention is implemented.

FIG. 1 shows a network processing system 100 in which the invention is implemented. The system 100 includes a network processor 102 having an internal memory 104. The network processor 102 is coupled to an external memory 106 as shown, and is configured to provide an interface for communicating cells, packets or other arrangements of data between a network 108 and a switch fabric 110. All such arrangements of data are intended to be encompassed by the general term "data block" as used herein. It is to be appreciated that the invention does not require any particular size or configuration of data blocks.

The processor 102 and its associated external memory 106 may be implemented, e.g., as one or more integrated circuits installed on a line card or port card of a router or switch. In such a configuration, the switch fabric 110 is generally considered to be a part of the router or switch.

Figure 2:
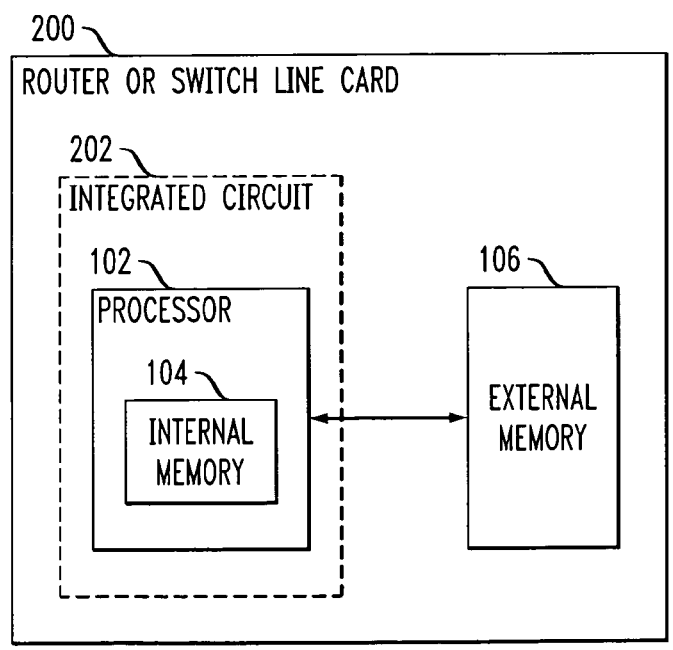
FIG. 2 illustrates one possible implementation of a network processor of the FIG. 1 system as an integrated circuit installed on a line card of a router or switch.

FIG. 2 illustrates an example router or switch line card embodiment of a portion of the system 100 of FIG. 1. In this embodiment, the processing system comprises a line card 200 having at least one integrated circuit 202 installed thereon. The integrated circuit 202 comprises network processor 102 which has internal memory 104. The network processor 102 interacts with external memory 106 on the line card 200. The external memory 106 may serve, e.g., as an external static random access memory (SRAM) or dynamic random access memory (DRAM) for the network processor integrated circuit 202. Such memories may be configured in a conventional manner. A suitable host processor may also be installed on the line card 200, and used for programming and otherwise controlling the operation of one or more network processor integrated circuits on the line card 200.

The portion of the processing system as shown in FIGS. 1 and 2 is considerably simplified for clarity of illustration. It is to be appreciated, however, that the processing system may comprise a router or switch which includes multiple line cards such as that shown in FIG. 2, and that each of the line cards may include multiple integrated circuits. A similar embodiment may be implemented in the form of a port card. However, the invention does not require such card-based implementation in a router, switch or other element.

It should also be understood that the particular arrangements of elements shown in FIGS. 1 and 2 are by way of illustrative example only. More specifically, as previously noted, the invention can be implemented in any type of processor, and is not limited to any particular network-based processing application.

Also, the system 100 and network processor 102 as illustrated in FIGS. 1 and 2 are considerably simplified for clarity of discussion, and may include other elements in addition to or in place of those specifically shown, including one or more elements of a type commonly found in a conventional implementation of such a system and network processor. For example, the network processor may include a classifier, queuing and dispatch logic, one or more memory controllers, interface circuitry for interfacing the network processor with the network 108, the switch fabric 110, the host processor 112 and other external devices, as well as other conventional elements not explicitly shown in the figure. These and other conventional elements, being well understood by those skilled in the art, are not described in detail herein.

The functionality of the network processor 102 as described herein may be implemented at least in part in the form of software program code. For example, elements associated with the performance of scheduling operations in the network processor may be implemented at least in part utilizing elements that are programmable via instructions or other software that may be supplied to the network processor via an external host processor or other suitable mechanism. For example, information characterizing particular scheduling algorithms, or associated traffic shaping information, may be supplied to the network processor from the associated host processor or other suitable mechanism.

Figure 3:
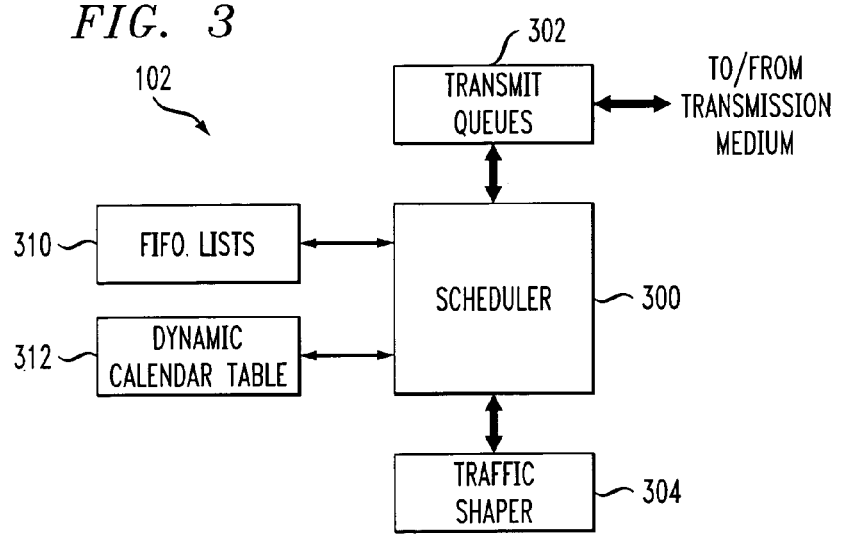
FIG. 3 is a more detailed view of a network processor of the FIG. 1 system configured in accordance with the techniques of the invention.

FIG. 3 shows a more detailed view of the network processor 102 in the illustrative embodiment of the invention. The network processor 102 in this embodiment includes a scheduler 300, transmit queues 302, a traffic shaper 304, a set of FIFO lists 310, and a dynamic calendar table 312.

The FIFO lists 310 and the dynamic calendar table 312 are examples of what are more generally referred to herein as "tables." Other types of tables may be used in alternative embodiments of the invention.

In operation, the scheduler 300 schedules data blocks associated with the transmit queues 302 for transmission over one or more transmission media which are not explicitly shown. The scheduling utilizes the FIFO lists 310 and dynamic calendar table 312, in conjunction with traffic shaping information from the traffic shaper 304, in scheduling the data blocks associated with the transmit queues 302 for transmission.

As indicated previously, the network processor 102 may include additional elements, for example, of a type described in the above-cited U.S. patent applications, or of a conventional type known to those skilled in the art, and such elements, being described elsewhere, are not further described herein.

The scheduler 300 is an example of an element referred to more generally herein as "scheduling circuitry." In other embodiments, scheduling circuitry may include in addition to the scheduler 300 at least a portion of at least one of the FIFO lists 310 and the dynamic calendar table 312, or other arrangements of one or more of hardware, software and firmware capable of implementing the scheduling techniques of the present invention. Thus, although shown as separate from the scheduler 300 in the figure, the FIFO lists 310 and the dynamic calendar table 312 or suitable portions thereof may be incorporated into scheduling circuitry in accordance with the invention. The scheduler 300 may utilize any arrangement of logic gates, processing elements or other circuitry capable of providing scheduling functionality of the type described herein. Scheduling circuitry in accordance with the invention may thus comprise otherwise conventional general-purpose network processor circuitry which is adaptable under software control to provide at least a portion of a scheduling function in accordance with the invention. Numerous such circuitry arrangements will be readily apparent to those skilled in the art, and are therefore not described in detail herein.

The FIFO lists 310 and dynamic calendar table 312 may be stored at least in part in the internal memory 104 of the network processor 102, and may also or alternatively be stored at least in part in the external memory 106 of the network processor 102. When stored using internal memory, at least a portion of such memory may be internal to the scheduler or other scheduling circuitry.

In addition to the elements 310 and 312, scheduler 300 may include or otherwise have associated therewith a number of time slot tables or other types of table elements suitable for use in static or dynamic table-based scheduling of a type described in the above-cited U.S. patent applications, or of a type known in conventional practice.

The transmit queues 302 may be viewed as comprising a plurality of transmission elements. For example, the transmit queues may comprise a plurality of transmission queues and associated control logic, with each of the transmission queues corresponding to a transmission element. It should be noted, however, that the term "transmission element" as used herein is intended to be construed more generally so as to encompass any source of one or more data blocks that are to be scheduled for transmission in the network processor 102.

Packets or other data blocks can be enqueued in transmission elements of the transmit queues 302 from an associated network processor data path, not explicitly shown in the figure. This may occur in conjunction with packet enqueue messages and associated data blocks received from such a data path. Similarly, packets or other data blocks can be dequeued from the transmission elements to the data path upon transmission, for example, in conjunction with packet dequeue messages and associated data blocks being sent to the data path.

The traffic shaper 304 may be implemented, by way of example, as an otherwise conventional traffic shaping engine which establishes one or more traffic shaping requirements, in a known manner, for the transmission of the data blocks from the transmission elements of the transmit queues 302. The traffic shaper 304 may be viewed as an example of what is more generally referred to herein as "traffic shaping circuitry," and other types of traffic shaping circuitry may be used in alternative embodiments. The traffic shaper may receive information regarding queue and scheduler status from the transmit queues 302 via the scheduler 300. The traffic shaper may generate traffic shaping information such as queue transmission interval and prioritization for establishing a class of service (CoS) or other desired service level for one or more of the transmission elements or their corresponding network connections.

In the illustrative embodiment, the FIFO lists 310 are utilized by the scheduler 300 to implement one or more weighted fair queuing scheduling algorithms, and the dynamic calendar table 312 is utilized by the scheduler to implement a number of rate-based scheduling algorithms, such as a constant bit rate algorithm and a variable bit rate algorithm. The manner in which the elements 310 and 312 are utilized in implementing their associated scheduling algorithm(s) will be described below in conjunction with FIGS. 4 and 5.

The following description will assume, without limitation, that the transmission elements, that is, the entities to be scheduled, comprise queues. The present invention, however, can be used to schedule any type of elements for which data blocks are to be transmitted.

The FIFO lists 310 are configured such that each list is capable of storing identifiers of each of a number of queues to be scheduled. For example, each of a plurality of queues of the transmit queues 302 may be individually assignable to one of the FIFO lists. The scheduler 300 also maintains an ActiveList pointer that specifies one of the lists as a highest-priority list.

Generally, in making a scheduling decision, the scheduler 300 will first look at the particular FIFO list pointed to by the ActiveList pointer. If this list is empty, it will move to the next list in numerical order and it will continue this process until it finds the first non-empty list. The scheduler thereby determines the first entry in the first non-empty FIFO list, and schedules the corresponding queue for transmission.

Figure 4:
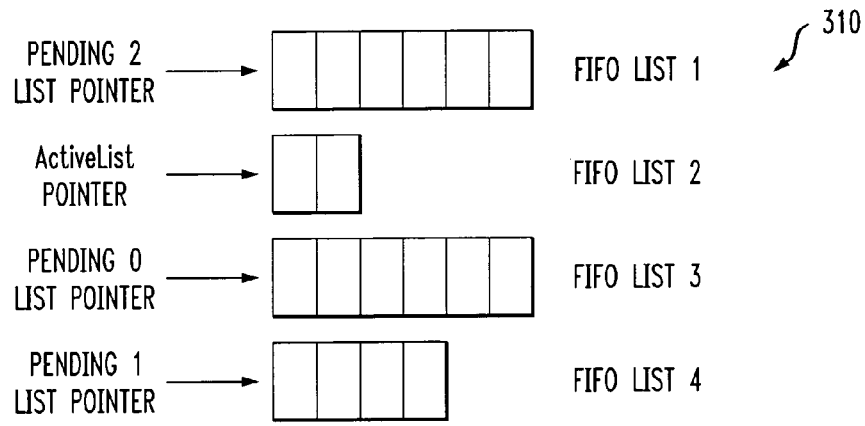
FIG. 4 shows an illustrative set of first-in first-out (FIFO) lists utilizable in a scheduling operation of the FIG. 3 processor in accordance with the invention.

FIG. 4 shows an example of the set of FIFO lists 310 including a total of four FIFO lists, denoted FIFO List 1, FIFO List 2, FIFO List 3 and FIFO List 4. As is apparent from the figure, each of the lists need not have the same number of entries. In this example, the ActiveList Pointer is pointing to FIFO List 2. If FIFO List 2 is empty, then the remaining lists will be searched in the order FIFO List 3, FIFO List 4, FIFO List 1, and so on. Additional list pointers may be maintained which indicate the order in which the remaining lists will be searched. As is shown in the figure, list pointers denoted as Pending 0, Pending 1 and Pending 2 point to FIFO List 3, FIFO List 4 and FIFO List 1, respectively.

The assignments of particular queues to the particular ones of the FIFO lists, and the current value of the ActiveList pointer, are preferably dynamic parameters that may be set under software control.

The set of FIFO lists 310 in the illustrative embodiment advantageously allows the scheduler to implement, by way of example, a fully work-conserving priority-based scheduling algorithm.

The dynamic calendar table 312 in the illustrative embodiment comprises a calendar table that is configured such that each of the plurality of queues to be dynamically assigned a transmission rate. Initially, prior to the scheduling of any queue, the calendar table is empty. The scheduler 300 maintains a pointer, denoted CurrentPointer, that is incremented with every pulse of a scheduling clock or other time base of the scheduler. The calendar table includes a plurality of slots, with each slot capable of storing the identifier of one of the queues.

A transmission rate is assigned for a given queue by entering an identifier of that queue into a particular slot of the calendar table. More specifically, the queue identifier is placed in the slot denoted by:

Scheduled Slot=CurrentPointer+Interval, where the interval denotes a dynamic value that is under software control and preferably can be changed at any time during operation. For example, the interval may be dynamically alterable under software control utilizing techniques such as those described in the above-cited U.S. patent application Ser. No. 10/085,222.

When a queue is scheduled in this manner, it is not eligible to transmit until the CurrentPointer reaches the slot that stores the identifier of that queue. This in effect establishes a particular maximum scheduling rate for the queue.

Figure 5:
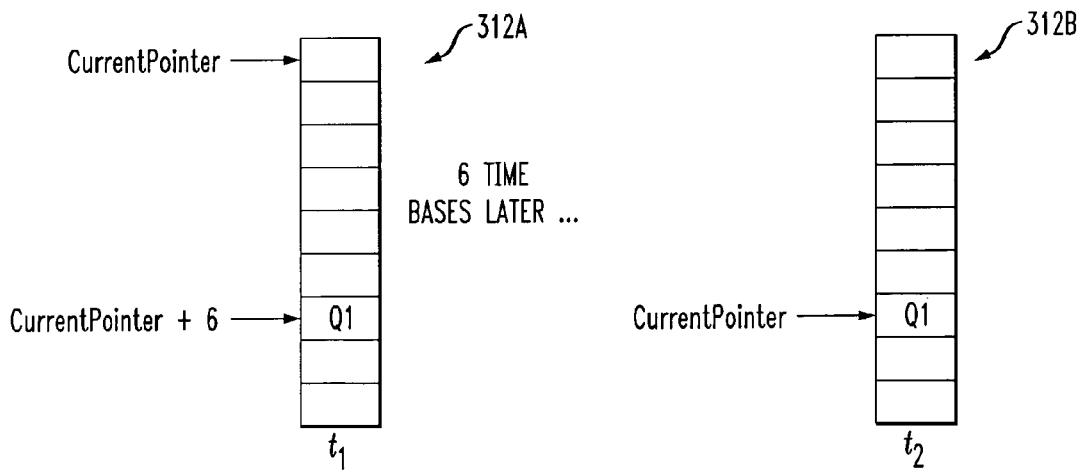
FIG. 5 illustrates the operation of a dynamic calendar table in a scheduling operation of the FIG. 3 processor in accordance with the invention.

FIG. 5 shows an example of the manner in which a given queue, denoted as Q1, can be scheduled using the dynamic calendar table 312. In this example, the interval is set to a value of six. At a first time $t_1$, the dynamic calendar table appears as indicated by reference 312A, with the CurrentPointer pointing to the first slot of the table, and the identifier of Q1 being stored in the slot identified as CurrentPointer+6. At a subsequent time $t_2$, corresponding to a time that is six time bases later than time $t_1$, the dynamic calendar table appears as indicated by reference 312B. At this point, the CurrentPointer has reached the slot in which the identifier of Q1 is stored, and Q1 can therefore transmit. The scheduling rate for Q1 in this example is thus determined by which of the table slots are assigned to that queue. As a more particular example, if there are a total of six slots in the table, and Q1 is assigned only one of the slots, its maximum scheduling rate will be one-sixth of the total table rate.

The scheduler 300 utilizes both the FIFO lists 310 and the dynamic calendar table 312 in scheduling queues for transmission. Generally, a given queue having at least one data block to transmit can be scheduled either in one of the FIFO lists or in the dynamic calendar table. Thus, at a particular point in time the given queue may be empty, that is, have no data block to transmit, or may be scheduled via one of the FIFO lists or the dynamic calendar table.

As indicated previously, the scheduler architecture described above allows multiple scheduling algorithms to be supported in an efficient and flexible manner. In the illustrative embodiment, the supported scheduling algorithms include constant bit rate, variable bit rate, and weighted fair queuing, although other algorithms can also be supported.

The constant bit rate and variable bit rate scheduling may be implemented for a given queue using the dynamic calendar table in the manner described above. Preferably, after a particular scheduling event, the queue is assigned to a slot in the table in a manner that, in conjunction with software control of the interval value, provides the desired rate.

Weighted fair queuing is generally provided using the set of FIFO lists 310. For example, the FIFO lists can be used to enforce differences in transmission bandwidth allocation between the queues.

As a more particular example, the FIFO lists may include an active list and a pending list, with the active list comprising a list of queues which have not exceeded their bandwidth allocation, and the pending list comprising a list of queues which have exceeded their bandwidth allocation. The bandwidth allocations may be determined over a programmable time interval based on relative rate partitions between the transmission elements. Per-queue thresholds may be defined to indicate when to change the status of a given queue from active to pending.

The scheduler ActiveList pointer in this example will initially point to the active list. When the active list is empty, the ActiveList pointer will be updated to point to the pending list. This latter list now becomes the active list and the other list becomes the pending list. Thus, the list pointed to by the ActiveList pointer in this two-list example is the active list, while the other list is the pending list. Based on the established thresholds, queues with lower bandwidth allocation will cross their thresholds faster than those with higher bandwidth allocation. These lower bandwidth queues will therefore spend more time in the pending list.

The scheduler 300 can also provide enhanced weighted fair queuing by implementing bandwidth limitations for one or more queues using the dynamic calendar table. For example, a queue that has been determined to have exceeded its bandwidth allocation can be sent from the FIFO lists to the dynamic calendar table in order to slow it down.

A weighted fair queuing scheduling algorithm in accordance with the invention may be programmable. For example, such an algorithm may be configurable under software control to implement one or more of a variety of different versions of the algorithm, including versions providing round robin scheduling, strict priority scheduling, weighted round robin scheduling, smooth weighted round robin scheduling and smooth deficit weighted round robin scheduling.

It should be noted that the invention does not require the use of the particular scheduling algorithms identified above. Examples of other scheduling algorithms that may be supported in a given embodiment of the invention include generic cell rate algorithm (GCRA), guaranteed frame rate (GFR) algorithm, resource reservation protocol (RSVP), as well as others, including minimum and maximum rate guarantee algorithms, and dynamic oversubscription algorithms.

As is apparent from the foregoing, the present invention in the illustrative embodiment provides an efficient and flexible scheduler architecture capable of supporting multiple scheduling algorithms. Advantageously, the architecture provides sufficient flexibility to allow the implementation of new algorithms as they are defined without requiring redesign of the hardware or other elements of the network processor.

The illustrative embodiment may be viewed, by way of example, as implementing a combination of a work-conserving bandwidth sharing mechanism and a non-work-conserving explicit rate establishment mechanism.

The above-described embodiments of the invention are intended to be illustrative only. For example, although the illustrative embodiment of FIG. 3 utilizes a scheduler which is separate from its associated FIFO lists and dynamic calendar tables, these elements or portions thereof may be incorporated into scheduling circuitry in accordance with the invention. Similarly, although transmit queues 302 and traffic shaper 304 are described as being separate from scheduler 300 in conjunction with the FIG. 3 embodiment, the associated functionality may be implemented at least in part within scheduling circuitry in accordance with the invention. Other embodiments can use different types and arrangements of processing elements for implementing the described functionality. For example, the FIFO lists and dynamic calendar table may be implemented using other types of table-based elements, implemented in internal memory, external memory or combinations of internal and external memory. In the case of internal memory, at least a portion of such memory may be internal to the scheduling circuitry. These and numerous other alternative embodiments within the scope of the following claims will be apparent to those skilled in the art.

What is claimed is:

1. A processor comprising:
    scheduling circuitry operative to schedule data blocks for transmission from a plurality of transmission elements, the scheduling circuitry being configurable for utilization of at least a first table and a second table in scheduling the data blocks for transmission; and
    memory circuitry associated with the scheduling circuitry and configurable to store at least a portion of at least one of the first and second tables;
    the first table configurable to include at least first and second lists of entries corresponding to transmission elements for which data blocks are to be scheduled in accordance with at least a first scheduling algorithm, the scheduler being operative to maintain a first table pointer identifying at least one of the first and second lists of the first table as having priority over the other of the first and second lists of the first table;
    the second table configurable to include a plurality of entries corresponding to transmission elements for which data blocks are to be scheduled in accordance with at least a second scheduling algorithm different than the first scheduling algorithm, association of a given one of the transmission elements with a particular one of the entries establishing a scheduling rate for that transmission element, the scheduler maintaining a second table pointer identifying a current one of the second table entries as being eligible for transmission.

2. The processor of claim 1 wherein the first table comprises a plurality of first-in first-out lists, the plurality of lists including the first and second lists and at least one additional list.

3. The processor of claim 1 wherein the first table pointer comprises an active list pointer identifying one of the first and second lists as an active list.

4. The processor of claim 1 wherein in scheduling data blocks for transmission utilizing the first table, the scheduling circuitry identifies a first entry in a first non-empty one of the lists starting from a list identified by the first table pointer, and schedules for transmission a data block from the corresponding transmission element.

5. The processor of claim 1 wherein one of the first and second lists of the first table comprises an active list and the other of the first and second lists of the first table comprises a pending list, wherein the active list comprises a list of one or more of the transmission elements which have not exceeded corresponding bandwidth allocations, and the pending list comprises a list of one or more of the transmission elements which have exceeded corresponding bandwidth allocations, the bandwidth allocations being determined over a programmable time interval based on relative rate partitions between the transmission elements.

6. The processor of claim 5 wherein the first table pointer initially points to the active list, and when the active list becomes empty, the pointer is updated to point to the pending list, the pending list is designated as a new active list, and the previous active list is designated as a new pending list.

7. The processor of claim 5 wherein a given transmission element which has exceeded its corresponding bandwidth allocation is moved from the first table to the second table in order to provide an adjustment in its scheduling rate.

8. The processor of claim 1 wherein the second table includes a plurality of slots, with each slot capable of storing the identifier of one of the transmission elements.

9. The processor of claim 1 wherein the second table pointer comprises a current pointer which is incremented in accordance with a time base of the scheduling circuitry.

10. The processor of claim 1 wherein the second table is configured such that each of the plurality of transmission elements can be dynamically assigned a transmission rate.

11. The processor of claim 1 wherein a desired scheduling rate for a given one of the transmission elements is established by entering an identifier of that element into a particular one of the entries of the second table, the particular entry being determined as a function of the second table pointer and a designated scheduling interval.

12. The processor of claim 11 wherein the designated scheduling interval is dynamically alterable under software control.

13. The processor of claim 1 wherein each of the transmission elements at a given point in time may have a corresponding entry in the first table or in the second table, but not in both the first table and the second table.

14. The processor of claim 1 wherein the first scheduling algorithm comprises a weighted fair queuing scheduling algorithm, the weighted fair queuing algorithm being configurable to implement at least one of round robin scheduling, strict priority scheduling, weighted round robin scheduling, smooth weighted round robin scheduling and smooth deficit weighted round robin scheduling.

15. The processor of claim 1 wherein the second scheduling algorithm comprises at least one of a constant bit rate scheduling algorithm and a variable bit rate scheduling algorithm.

16. The processor of claim 1 wherein the memory circuitry comprises at least one of internal memory and external memory of the processor.

17. The processor of claim 1 wherein one or more of the data blocks comprise data packets.

18. The processor of claim 1 wherein the processor comprises a network processor integrated circuit configured to provide an interface for data block transfer between a network and a switch fabric.

19. A method for use in a processor, the method comprising:
    storing at least a portion of at least one of a first table and a second table; and
    scheduling data blocks for transmission from a plurality of transmission elements, utilizing the first and second tables;
    the first table configurable to include at least first and second lists of entries corresponding to transmission elements for which data blocks are to be scheduled in accordance with at least a first scheduling algorithm;

a first table pointer identifying at least one of the first and second lists of the first table as having priority over the other of the first and second lists of the first table;

the second table configurable to include a plurality of entries corresponding to transmission elements for which data blocks are to be scheduled in accordance with at least a second scheduling algorithm different than the first scheduling algorithm, association of a given one of the transmission elements with a particular one of the entries establishing a scheduling rate for that transmission element;

a second table pointer identifying a current one of the second table entries as being eligible for transmission.

20. An article of manufacture comprising a computer-readable medium for use in conjunction with a processor, the medium storing one or more software programs for use in scheduling data blocks for transmission from a plurality of transmission elements, the one or more programs when executed implementing the step of:

scheduling data blocks for transmission from a plurality of transmission elements, utilizing first and second tables;

the first table configurable to include at least first and second lists of entries corresponding to transmission elements for which data blocks are to be scheduled in accordance with at least a first scheduling algorithm;

a first table pointer identifying at least one of the first and second lists of the first table as having priority over the other of the first and second lists of the first table;

the second table configurable to include a plurality of entries corresponding to transmission elements for which data blocks are to be scheduled in accordance with at least a second scheduling algorithm different than the first scheduling algorithm, association of a given one of the transmission elements with a particular one of the entries establishing a scheduling rate for that transmission element;

a second table pointer identifying a current one of the second table entries as being eligible for transmission.

* * * * *

UNITED STATES PATENT AND TRADEMARK OFFICE
CERTIFICATE OF CORRECTION

PATENT NO. : 7,477,636 B2 Page 1 of 1
APPLICATION NO. : 10/722933
DATED : January 13, 2009
INVENTOR(S) : A. Q. Khan et al.

It is certified that error appears in the above-identified patent and that said Letters Patent is hereby corrected as shown below:

Column 7, line 13, please delete "to" and insert --can--.

Claim 1, column 9, line 36, please delete "scheduler" and insert --scheduling circuitry--.

Claim 1, column 9, line 47, please delete "scheduler" and insert --scheduling circuitry--.

Signed and Sealed this

Twenty-fourth Day of February, 2009

JOHN DOLL
*Acting Director of the United States Patent and Trademark Office*